Oct. 28, 1930.  E. G. GOODELL  1,779,537
PROCESS OF REGENERATING BLACK LIQUORS
Filed April 1, 1929
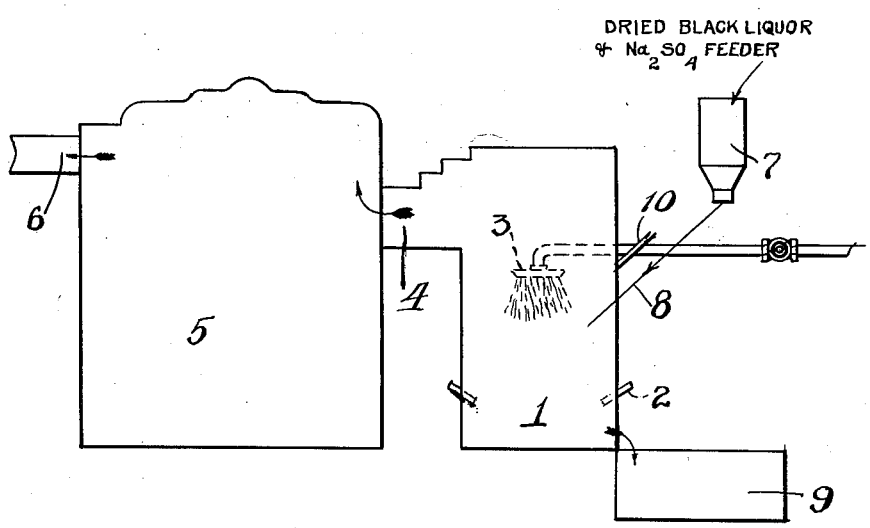
Inventor
Edward G. Goodell Patented Oct. 28, 1930

1,779,537

UNITED STATES PATENT OFFICE

EDWARD G. GOODELL, OF STEVENS POINT, WISCONSIN

PROCESS OF REGENERATING BLACK LIQUORS

Application filed April 1, 1929. Serial No. 351,661.

This invention relates to a process for regenerating black liquors such as are obtained in the manufacture of sulphate of kraft pulp.

In my copending application entitled "Process of treating black liquors", Serial No. 329,385, filed December 31, 1928, I have described a method of spray drying black liquor and burning the spray dried product under reducing conditions in a smelting furnace to effect the reduction of the sulphate values to sulphide. I have now found that it is possible to obtain satisfactory reduction efficiency by combining my method of spray drying black liquor with the method of spray burning black liquor sometimes used in sulphate mills.

Heretofore, in spraying a highly concentrated black liquor directly into a smelting furnace for effecting combustion of the black liquor, it has been found that under the conditions obtainable in the smelting furnace, the efficiency of the reduction of the sulphate to sulphide is not entirely satisfactory. This is probably due to the fact that it is difficult, if not impossible practically, to maintain the necessary conditions for an efficient reduction of the sulphate content to sulphide while at the same time supplying sufficient air for the combustion of the concentrated black liquor. It will, of course, be understood that while sodium sulphate is added to replace losses in the recovery cycle, its value in this respect is largely dependent upon the efficiency of its reduction to the active cooking agent, sodium sulphide.

It is therefore an object of this invention to provide an improved process for regenerating black liquors wherein a portion of the black liquor to be regenerated is added in the form of a dry product high in organic content while the remainder of the black liquor is burned in a sprayed form.

It is a further important object of this invention to provide a combined process of spray drying and spray burning black liquor wherein an efficient reduction of sulphate to sulphide is obtained.

Other and further important objects of this invention will become apparent from the following description and appended claim.

The general layout of apparatus suited for the carrying out of my process is described in my copending application entitled "Method of dehydrating black liquor", Serial No. 351,660, filed April 1, 1929. According to my present process, a portion of the black liquor obtained in the manufacture of pulp by the sulphate process is dehydrated in a suitable spray drying chamber or chambers to obtain a substantially dry finely divided product high in organic content and heat value. Another portion of the black liquor in a highly concentrated liquid form is introduced directly into a smelting furnace and burned in spray form under oxidizing conditions.

Into the same smelting furnace in which the concentrated black liquor is being burned, is introduced a mixture of sodium sulphate and the dried black liquor obtained by my spray drying process. Preferably the sodium sulphate and dried black liquor are introduced as an intimate admixture into the lower portion of the smelting furnace below the zone of most active combustion of the sprayed black liquor. Under these conditions, it has been found that a very efficient reduction of the sulphate content, including both the added sodium sulphate and the metallic sulphate present in the black liquor, is effected.

In the accompanying drawing, which illustrates more or less diagrammatically the means for carrying out my process, the reference numeral 1 indicates a smelting furnace near the bottom of which are positioned one or more tuyeres 2 for the introduction of a limited quantity of air to that part of the furnace wherein the reduction takes place. A highly concentrated solution of black liquor is sprayed through device 3 to the upper part of smelting furnace where additional air 10 to support combustion of said concentrated black liquor is also introduced. The gaseous products of combustion escape from the top of the smelting furnace 1 through a passage 4 to a waste heat boiler 5 from which the hot gases may be led to a spray drying chamber and auxiliary equipment as described in my copending application, Serial No. 329,385; or the gases may be discharged directly from waste heat boiler to stack. The molten sodium compounds flow continuously from smelting furnace into dissolving tank 9, from which the solution passes through the usual steps necessary in preparing the recovered sodas for re-use in producing pulp.

A mixture of dried black liquor and sodium sulphate is added from a feed tank 7 through a pipe or conveyor 8. The mixture of sodium sulphate and dried black liquor is preferably charged into the smelting furnace below the central zone of combustion of the sprayed black liquor and consequently mixes with the hot solid particles resulting from such combustion, and the combined solid particles build up upon the floor of the smelting furnace to form a reasonably thick bed of the material, preferably coming up well above the tuyères to give best results. It is in this lower area that the reduction of the sulphate to sulphide occurs. Under efficient operating conditions it has been found possible to produce a smelt containing only 2% unreduced sodium sulphate, whereas 10% of unreduced sulphate is considered good practice when burning black ash according to heretofore used methods, while in the spray burning of black liquor alone the amount of unreduced sulphate is generally much higher than in the case of burning black ash.

It appears that the intimate admixture of carbonaceous material present in the dried black liquor with the sodium sulphate serves to produce the necessary conditions for efficient reduction of the sulphate added in the form of sodium sulphate and present in the black liquor itself. In general, about one-third of the total black liquor is introduced into the smelting furnace in dried form while the remaining two-thirds is introduced by spraying in liquid form.

The heat for driving off the water from the sprayed black liquor to a point at which the black liquor becomes able to support its own combustion is actually furnished by the combustion of the dry, black liquor solids introduced as such into the smelting furnace. Consequently, the sprayed black liquor does not burn entirely or even largely while in suspension but mostly at or slightly above the surface of the bed of molten material that builds up on the floor of the furnace. In view of this fact and the arrangement whereby the concentrated black liquor is sprayed downwardly upon the bed of molten material, the path of travel of the hot solid particles resulting from the combustion of the sprayed black liquor is comparatively short and consequently losses due to volatilization of the mineral constituents and entrainment of the finely divided solid particles in the stack gases are minimized.

I am aware that many changes may be made and numerous details of my process may be varied through a wide range without departing from the principles of this invention, and I, therefore, do not purpose limiting the patent granted hereon otherwise than necessitated by the prior art.

I claim as my invention:

The process of regenerating black liquor, which comprises spray burning a portion of black liquor under oxidizing conditions in a zone closely above and near the surface of a bed composed of the solid products of combustion of said black liquor and spray dried black liquor solids introduced as such in admixture with sodium sulphate, said black liquor solids being at the time of introduction substantially dry and high in organic content, the heat of combustion of said organic content supplying the requisite amount of heat for driving off the water from said sprayed black liquor to permit combustion thereof without the use of any foreign fuel and the said organic content at the same time serving under the conditions obtaining to effect the reduction of sulphates present in the bed to sulphides.

In testimony whereof I have hereunto subscribed my name at Stevens Point, Portage County, Wisconsin.

EDWARD G. GOODELL.